US012718322B2

(12) United States Patent
Dong

(10) Patent No.: US 12,718,322 B2
(45) Date of Patent: Aug. 25, 2026

(54) VIDEO SUPER-RESOLUTION METHOD AND APPARATUS

(71) Applicant: Beijing Bytedance Network Technology Co., Ltd., Beijing (CN)

(72) Inventor: Hang Dong, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 236 days.

(21) Appl. No.: 18/725,636

(22) PCT Filed: Mar. 17, 2023

(86) PCT No.: PCT/CN2023/082228
§ 371 (c)(1),
(2) Date: Jun. 28, 2024

(87) PCT Pub. No.: WO2023/174416
PCT Pub. Date: Sep. 21, 2023

(65) Prior Publication Data

US 2025/0173827 A1 May 29, 2025

(30) Foreign Application Priority Data

Mar. 17, 2022 (CN) ......................... 202210265124.7

(51) Int. Cl.
*G06T 3/40* (2024.01)
*G06T 3/4053* (2024.01)
*G06T 7/246* (2017.01)

(52) U.S. Cl.
CPC ............ *G06T 3/4053* (2013.01); *G06T 7/246* (2017.01); *G06T 2207/10016* (2013.01); *G06T 2207/20021* (2013.01)

(58) Field of Classification Search
CPC .................. G06T 3/4053; G06T 7/246; G06T 2207/10016; G06T 2207/20021;
(Continued)

(56) References Cited

U.S. PATENT DOCUMENTS 9,258,518 B2 2/2016 Salvador et al.
11,778,223 B2 * 10/2023 Liu ..................... H04N 19/184 375/240.15

(Continued)

FOREIGN PATENT DOCUMENTS

CN 103632359 A 3/2014
CN 111489292 A 8/2020

(Continued)

OTHER PUBLICATIONS

Decision to Grant received for Japanese Patent Application No. 2024-539756, mailed on Nov. 18, 2025, 5 pages (2 pages of English Translation and 3 pages of Original Document).

(Continued)

*Primary Examiner* — Kent Yip
(74) *Attorney, Agent, or Firm* — Astute IP Law Group

(57) ABSTRACT

The present disclosure relates to the technical field of image processing. Provided in the embodiments of the present disclosure are a video super-resolution method and apparatus. The method includes: separately decomposing into N image blocks the t-th image frame of a video to be subjected to super-resolution and a neighborhood image frame of the t-th image frame; generating N image block sequences; computing motion parameters of each image block sequence; according to the motion parameters of each image block sequence, determining a super-resolution network model corresponding to each image block sequence; using the corresponding super-resolution network model to perform super-resolution on the image block of the t-th image (Continued)

decompose a t-th image frame of a video to be super-resolved and a neighborhood image frame of the t-th image frame into N image blocks, respectively — S11 generate N image block sequences according to the image blocks obtained by decomposing the t-th image frame and the neighborhood image frame — S12 calculate motion parameters of the image block sequences — S13 determine super-resolution network models corresponding to the image block sequences according to the motion parameters of the image block sequences — S14 perform super-resolution on the image blocks of the t-th image frame in the image block sequences by using the super-resolution network models corresponding to the image block sequences, to obtain super-resolution image blocks of the t-th image frame — S15 generate a super-resolution image frame of the t-th image frame according to the super-resolution image blocks of the t-th image frame — S16 frame in each image block sequence, to obtain super-resolution image blocks of the t-th image frame; and according to the super-resolution image blocks of the t-th image frame, generating a super-resolution image frame of the t-th image frame.

19 Claims, 7 Drawing Sheets

(58) Field of Classification Search
CPC ....... G06T 3/4046; G06T 3/4038; G06T 5/50; G06T 2207/20216; G06T 2207/20221; H04N 7/014; H04N 7/0102; H04N 7/0127
See application file for complete search history.

(56) References Cited

U.S. PATENT DOCUMENTS 12,236,556 B2 * 2/2025 Zhang ................ H04N 21/2356
2010/0034477 A1 2/2010 Crisan et al.

FOREIGN PATENT DOCUMENTS

| | | | |
|---|---|---|---|
| CN | 112950471 | A | 6/2021 |
| CN | 113592709 | A | 11/2021 |
| JP | 2001-250119 | A | 9/2001 |
| WO | 2020/166596 | A1 | 8/2020 |

OTHER PUBLICATIONS

International Search Report and Written Opinion for PCT/CN2023/082228, mailed Apr. 20, 2023, 13 pages.
Kong et al., “ClassSR: A General Framework to Accelerate Super-Resolution Networks by Data Characteristic”, Computer Vision and Pattern Recognition, Mar. 6, 2021, 16 pages.
Kroeger et al., “Fast Optical Flow using Dense Inverse Search”, Computer Vision and Pattern Recognition (cs.CV), Robotics, Mar. 11, 2016, 25 pages.
Wang et al., “EDVR: Video Restoration with Enhanced Deformable Convolutional Networks”, Computer Vision and Pattern Recognition, May 7, 2019, 10 pages.
Extended European Search Report received for European Application No. 23769918.6, mailed on Feb. 26, 2026, 6 pages.
Shahar et al., “Space-Time Super-Resolution from a Single Video”, IEEE CVPR, 2011, pp. 3353-3360.

* cited by examiner

VIDEO SUPER-RESOLUTION METHOD AND APPARATUS

CROSS-REFERENCE TO RELATED APPLICATIONS

This this a national stage application of International Patent Application No. PCT/CN2023/082228, filed Mar. 17, 2023, which claims priority of the Chinese application No. 202210265124.7 filed on Mar. 17, 2022, the disclosures of which are incorporated by reference herein in their entireties.

TECHNICAL FIELD

The present disclosure relates to the technical field of image processing, and in particular, to a video super-resolution method and apparatus.

BACKGROUND

Super-resolution technology for a video, also called as video super-resolution technology, is a technology of recovering a high-resolution video from a low-resolution video. Since a video super-resolution business has become a key business in video quality enhancement at present, the video super-resolution technology is one of research hotspots in the current image processing field.

In recent years, with the development of deep learning technology, in a video super-resolution network model based on a deep learning neural network, many breakthroughs have been achieved, comprising better super-resolution effect and better real-time performance. At present, mainstream sliding window-type video super-resolution network models all utilize the fact that most image frames in a video are all in motion, so that when super-resolution is performed on each image frame in the video, its neighborhood image frames all can provide a large amount of time domain information, for the video super-resolution network model to perform super-resolution on the current image frame.

SUMMARY

In a first aspect, an embodiment of the present disclosure provides a video super-resolution method, comprising:

decomposing a t-th image frame of a video to be super-resolved and a neighborhood image frame of the t-th image frame, into N image blocks, respectively, t and N being both positive integers;

according to the image blocks obtained by decomposing the t-th image frame and the neighborhood image frame, generating N image block sequences, image blocks in the image block sequence being located at same positions of different image frames, respectively;

calculating motion parameters of the image block sequences, motion parameters of any image block sequence being configured for representing optical flows between image blocks of adjacent image frames in the image block sequence;

determining super-resolution network models corresponding to the image block sequences according to the motion parameters of the image block sequences;

performing super-resolution on the image blocks of the t-th image frame in the image block sequences by using the super-resolution network models corresponding to the image block sequences, to obtain super-resolution image blocks of the t-th image frame; and generating a super-resolution image frame of the t-th image frame according to the super-resolution image blocks of the t-th image frame.

In a second aspect, an embodiment of the present disclosure provides a video super-resolution apparatus, comprising:

an image decomposition module configured to decompose a t-th image frame of a video to be super-resolved and a neighborhood image frame of the t-th image frame, into N image blocks, respectively, t and N being both positive integers;

a sequence generation module configured to generate N image block sequences according to the image blocks obtained by decomposing the t-th image frame and the neighborhood image frame, image blocks in the image block sequence being located at same positions of different image frames, respectively;

a parameter calculation module configured to calculate motion parameters of the image block sequences, motion parameters of any image block sequence being configured for representing optical flows between image blocks of adjacent image frames in the image block sequence;

a model determination module configured to determine super-resolution network models corresponding to the image block sequences according to the motion parameters of the image block sequences;

an image super-resolution module configured to perform super-resolution on the image blocks of the t-th image frame in the image block sequences by using the super-resolution network models corresponding to the image block sequences, to obtain super-resolution image blocks of the t-th image frame; and an image generation module configured to generate a super-resolution image frame of the t-th image frame according to the super-resolution image blocks of the t-th image frame.

In a third aspect, an embodiment of the present disclosure provides an electronic device, comprising: a memory and a processor, the memory configured to store a computer program; and the processor configured to, when calling the computer program, cause the electronic device to implement the video super-resolution method according to the first aspect or any of optional implementations of the first aspect.

In a fourth aspect, an embodiment of the present disclosure provides a computer-readable storage medium which, when executed by a computing device, causes the computing device to implement the video super-resolution method according to the first aspect or any of optional implementations of the first aspect.

In a fifth aspect, an embodiment of the present disclosure provides a computer program product, which when run on a computer, causes the computer to implement the video super-resolution method according to the first aspect or any of optional implementations of the first aspect.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

In order to more clearly illustrate technical solutions in the embodiments of the present disclosure or the related art, the drawings that need to be used in the description of the embodiments or the related art will be briefly described below, and it is obvious that for one of ordinary skill in the art, other drawings can be obtained without paying inventive labor.

DETAILED DESCRIPTION

Figure 1:
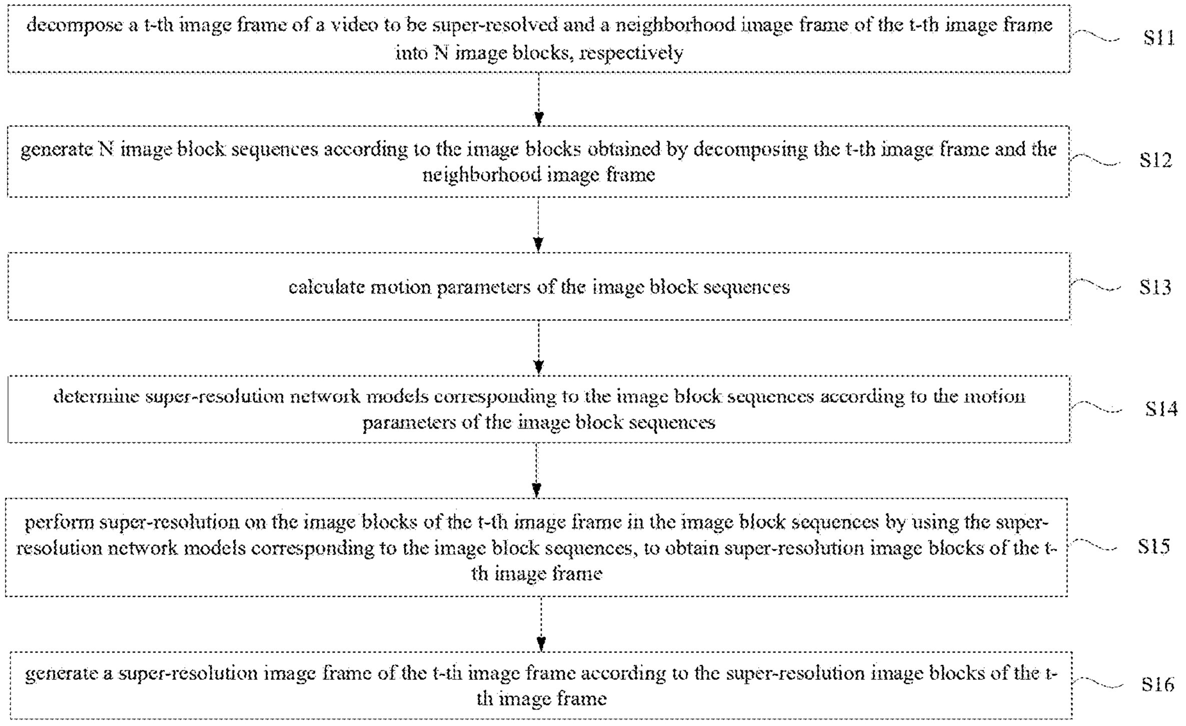
FIG. 1 is a step flow diagram of a video super-resolution method according to an embodiment of the present disclosure.

In order that the above objectives, features and advantages of the present disclosure may be more clearly understood, solutions of the present disclosure will be further described below. It should be noted that, without conflict, the embodiments of the present disclosure and features in the embodiments may be combined with each other.

In the following description, numerous specific details are set forth in order to provide a thorough understanding of the present disclosure, but the present disclosure may be implemented in other way than those described herein; and it is obvious that the embodiments in the description are only a part of the embodiments of the present disclosure, rather than all of them.

It should be noted that, for the convenience of clearly describing the technical solutions of the embodiments of the present disclosure, in the embodiments of the present disclosure, same or similar items with basically same functions and effects are distinguished by using words such as "first", "second", etc., and those skilled in the art can understand that the words such as "first", "second", etc. do not limit the quantity and execution order. For example: a first feature image set and a second feature image set are only configured for distinguishing different feature image sets, rather than limiting the order of the feature image sets.

In the embodiments of the present disclosure, words such as "exemplary" or "for example" are configured for indicating an example, instance, or illustration. Any embodiment or design solution described as "exemplary" or "for example" in the embodiments of the present disclosure should not be construed as more preferred or advantageous than another embodiment or design solution. Exactly, the use of the word "exemplary" or "for example" is intended to present relevant concepts in a specific manner. Furthermore, in the description of the embodiments of the present disclosure, the meaning of "a plurality" means two or more unless otherwise specified.

In the related art, sliding window-type video super-resolution network models all utilizes the fact that most image frames of a video are all in motion, so that when super-resolution is performed on each image frame in the video, its neighborhood image frames can all provide a large amount of time domain information, for the video super-resolution network model to perform super-resolution on the current image frame. However, in some videos, some areas are always stationary objects or backgrounds, and when super-resolution is performed on such videos, due to time domain redundant information brought by the stationary objects or backgrounds, a relatively ideal video super-resolution effect cannot often be obtained by using the neighborhood image frames as inputs, and even the super-resolution effect is inferior to that of super-resolution based on a single image frame. In summary, when time domain redundant information exists in a video, how to improve the super-resolution effect of the video is a problem to be solved urgently.

In view of this, the present disclosure provides a video super-resolution method and apparatus, for improving a video super-resolution effect.

An embodiment of the present disclosure provides a video super-resolution method, and referring to a step flow diagram shown in FIG. 1, the video super-resolution method provided in the embodiment of the present disclosure comprises the following steps S11 to S16:

S11, decomposing a t-th image frame of a video to be super-resolved and a neighborhood image frame of the t-th image frame, into N image blocks, respectively, wherein the t and N are both positive integers.

In some embodiments, an implementation of decomposing any image frame into N image blocks comprises: by a sampling window with a size of one image block sliding from a first pixel of the image frame with a preset stride, sampling positions of the image frame, and taking each sampling area of the sampling window as one image block, thereby decomposing the image frame into the N image blocks.

Figure 2:
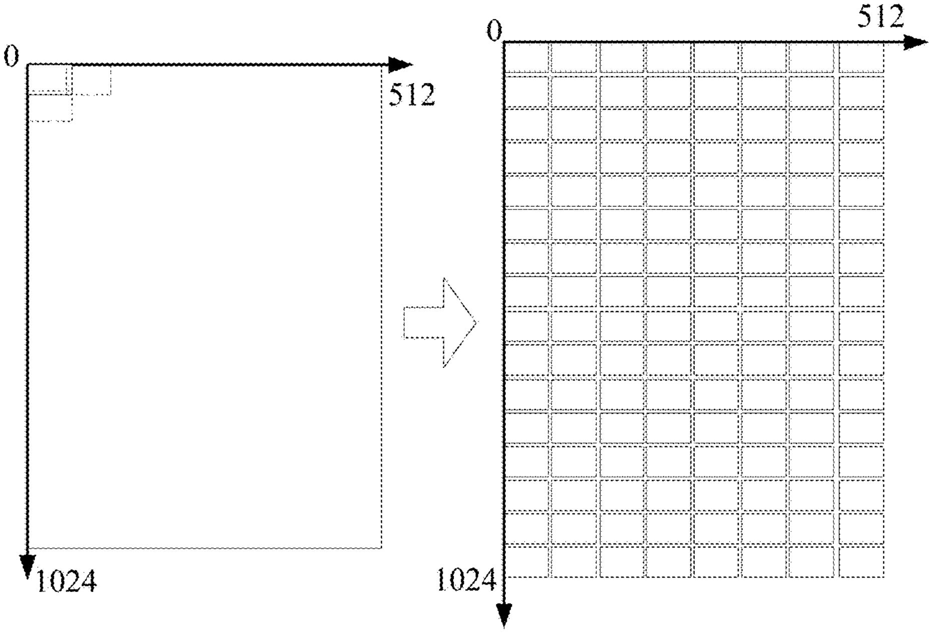
FIG. 2 is a schematic diagram of image blocks obtained by decomposing an image frame according to an embodiment of the present disclosure.

Exemplarily, referring to FIG. 2, a t-th image frame of a video to be super-resolved comprises 1024*512 pixels, and when the sampling window has a size of 72*72 and a stride of 64, the t-th image frame of the video to be super-resolved may be decomposed into 16*8 image blocks, each image block comprising 72*72 pixels, and adjacent image blocks having an overlapping area therebetween, which has a width of 8 pixels.

The method comprises S12, generating N image block sequences according to the image blocks obtained by decomposing the t-th image frame and the neighborhood image frame, wherein image blocks in the image block sequence are located at same positions of different image frames, respectively.

Figure 3:
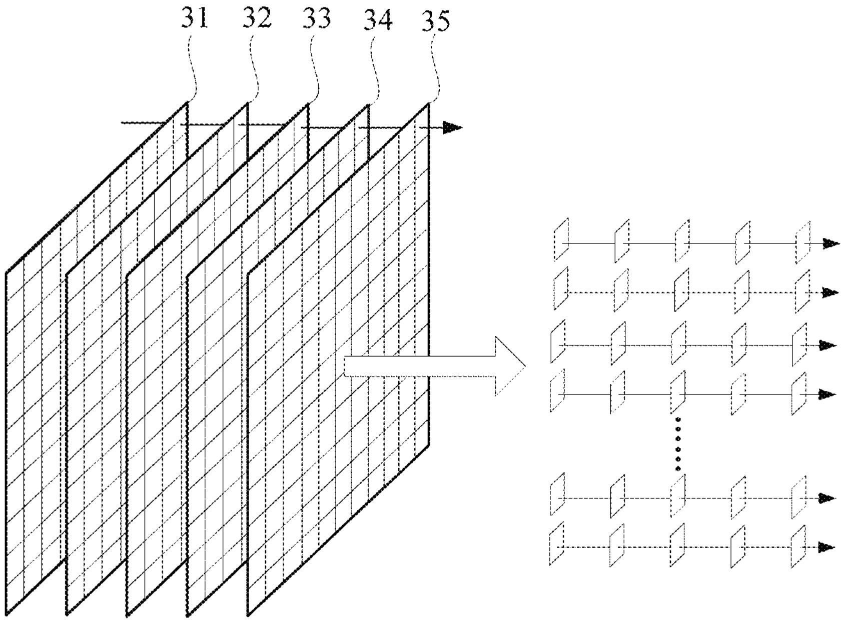
FIG. 3 is a schematic diagram of an image block sequence according to an embodiment of the present disclosure.

Exemplarily, referring to FIG. 3, the neighborhood image frame of the t-th image frame 33 comprises: a (t−2)-th image frame 31, a (t−1)-th image frame 32, a (t+1)-th image frame 34, and a (t+2)-th image frame 35, illustrated as an example. Each image block sequence comprises 5 image blocks, which respectively are image blocks of the (t−2)-th image frame 31, the (t−1)-th image frame 32, the t-th image frame 33, the (t+1)-th image frame 34 and the (t+2)-th image frame 35, and image blocks located in the same image block sequence have same positions in image frames to which the image blocks belong.

The method comprises S13, calculating motion parameters of the image block sequences, wherein motion parameters of any image block sequence are configured for representing optical flows between image blocks of adjacent image frames in the image block sequence.

Exemplarily, an image block sequence $$\{x^i_{[t-2:t+2]}\}$$

comprises: an image block $$x^i_{t-2}$$

of the (t−2)-th image frame, an image block $$x^i_{t-1}$$

of the (t−1)-th image frame, an image block $$x^i_t$$

of the t-th image frame, an image block $$x^i_{t+1}$$

of the (t+1)-th image frame, and an image block $$x^i_{t+2}$$

of the (t+2)-th image frame, then motion parameters of the image block sequence $$\{x^i_{[t-2:t+2]}\}$$

are configured for representing an optical flow between the image blocks $$x^i_{t-2} \text{ and } x^i_{t-1},$$

an optical flow between the image blocks $$x^i_{t-1} \text{ and } x^i_t,$$

an optical flow between the image blocks $$x^i_t \text{ and } x^i_{t+1},$$

and an optical flow between the image blocks $$x^i_{t+1} \text{ and } x^i_{t+2}.$$

As an optional implementation of the embodiment of the present disclosure, the calculating motion parameters of the image block sequences comprises, for each image block sequence, performing the following steps a to c:

step a, calculating optical flows between image blocks of adjacent image frames in the image block sequence.

As described above, the image block sequence $$\{x^i_{[t-2:t+2]}\}$$

comprises: the image block $$x^i_{t-2}$$

of the (t−2)-th image frame, the image block $$x^i_{t-1}$$

of the (t−1)-th image frame, the image block $$x^i_t$$

of the t-th image frame, the image block $$x^i_{t+1}$$

of the (t+1)-th image frame, and the image block $$x^i_{t+2}$$

of the (t+2)-th image frame, then the optical flow between the image blocks $$x^i_{t-2} \text{ and } x^i_{t-1},$$

the optical flow between the image blocks $$x^i_{t-1} \text{ and } x^i_t,$$

the optical flow between the image blocks $$x_t^i \text{ and } x_{t+1}^i,$$

and the optical flow between the image blocks $$x_{t+1}^i \text{ and } x_{t+2}^i$$

are calculated.

Exemplarily, the optical flows between the image blocks of the adjacent image frames in the image block sequence may be calculated based on a dense inverse search (DIS) optical flow algorithm.

The method comprises Step b, for an optical flow between image blocks of each pair of adjacent image frames, calculating an average value of absolute values of optical flows corresponding to pixels, to obtain a motion parameter between the image blocks of the adjacent image frames.

The motion parameter between the image blocks of the adjacent image frames in the image block sequence $$\{x_{[t-2:t+2]}^i\}$$

is represented as:

$$m_{q\to q+1}^i,$$

the optical flow algorithm is represented as f( . . . ), averaging the optical flows corresponding to the pixels is represented as mean( . . . ), and calculating an absolute value is represented as | . . . |, then:

$$m_{q\to q+1}^i = \text{mean}(|f(x_q^i, x_{q+1}^i)|)$$

For example, the motion parameter between the image blocks $$x_{t-1}^i \text{ and } x_t^i$$

is:

$$m_{-1\to 0}^i = \text{mean}(|f(x_{t-1}^i, x_t^i)|)$$

For another example, the motion parameter between the image blocks $$x_{t+1}^i \text{ and } x_{t+2}^i$$

is:

$$m_{2\to 1}^i = \text{mean}(|f(x_{t+2}^i, x_{t+1}^i)|)$$

The method comprises Step S14, determining super-resolution network models corresponding to the image block sequences according to the motion parameters of the image block sequences.

As an optional implementation of the embodiment of the present disclosure, the neighborhood image frame of the t-th image frame comprises the (t−2)-th image frame, the (t−1)-th image frame, the (t+1)-th image frame, and the (t+2)-th image frame, and the above step S14 (determining super-resolution network models corresponding to the image block sequences according to the motion parameters of the image block sequences) comprises, for each image block sequence, performing the following steps 1 to 5:

step 1, determining whether a first motion parameter and a second motion parameter of the image block sequence are both less than a preset threshold.

The first motion parameter is a motion parameter between the image block of the t-th image frame and the image block of the (t−1)-th image frame, and the second motion parameter is a motion parameter between the image block of the t-th image frame and the image block of the (t+1)-th image frame.

Let: the motion parameter between the image block $$x_t^i$$

of the t-th image frame and the image block $$x_{t-1}^i$$

of the (t−1)-th image frame is $$m_{-1\to 0}^i,$$

the motion parameter between the image block $$x_{t+1}^i$$

of the (t+1)-th image frame and the image block $$x_t^i$$

of the t-th image frame is $$m_{1\to 0}^i,$$

and the preset threshold is γ, then the above step 1 is to determine whether $$m_{-1\to 0}^i \text{ and } m_{1\to 0}^i$$

are less than γ, respectively.

In the above step 1, if the first motion parameter and the second motion parameter are both less than the preset threshold, the following step 2 is performed.

The method comprises Step 2, determining a super-resolution network model corresponding to the image block sequence as a first super-resolution network model.

As an optional implementation of the embodiment of the present disclosure, the first super-resolution network model is a single-frame super-resolution network model.

In the above step 1, if the first motion parameter and/or the second motion parameter are/is greater than or equal to the preset threshold, the following step 3 is performed.

The method comprises Step 3, determining whether a third motion parameter and a fourth motion parameter of the image block sequence are both less than the preset threshold.

The third motion parameter is a motion parameter between the image block of the (t−2)-th image frame and the image block of the (t−1)-th image frame, and the fourth motion parameter is a motion parameter between the image block of the (t+1)-th image frame and the image block of the (t+2)-th image frame.

Let: the motion parameter between the image block $$x_{t-2}^i$$

of the (t−2)-th image frame and the image block $$x_{t-1}^i$$

of the (t−1)-th image frame is $$m_{-2\to-1}^i,$$

the motion parameter between the image block $$x_{t+1}^i$$

of the (t+1)-th image frame and the image block $$x_{t+2}^i$$

of the (t+2)-th image frame is $$m_{2\to1}^i,$$

and the preset threshold is γ, then the above step 3 is to determine whether $$m_{-2\to-1}^i \text{ and } m_{2\to1}^i$$

are less than the preset threshold, respectively.

In the above step 3, if the third motion parameter and the fourth motion parameter are both less than the preset threshold, the following step 4 is performed.

The method comprises Step 4, determining a super-resolution network model corresponding to the image block sequence as a second super-resolution network model.

As an optional implementation of the embodiment of the present disclosure, the second super-resolution network model is configured for performing super-resolution on the image blocks of the t-th image frame based on the image block of the (t−1)-th image frame, the image block of the t-th image frame, and the image block of the (t+1)-th image frame.

In the above step 3, if the third motion parameter and/or the fourth motion parameter are/is greater than or equal to the preset threshold, the following step 5 is performed.

The method comprises Step 5, determining a super-resolution network model corresponding to the image block sequence as a third super-resolution network model.

As an optional implementation of the embodiment of the present disclosure, the third super-resolution network model is configured for performing super-resolution on the image block of the t-th image frame based on all the image blocks in the image block sequence.

Let: the motion parameter between the image block $$x_t^i$$

of the t-th image frame and the image block $$x_{t-1}^i$$

of the (t−1)-th image frame is $$m_{-1\to0}^i,$$

the motion parameter between the image block $$x_{t+1}^i$$

of the (t+1)-th image frame and the image block $$x_t^i$$

of the t-th image frame is $$m_{1\to0}^i,$$

the motion parameter between the image block $$x_{t-2}^i$$

of the (t−2)-th image frame and the image block $$x_{t-1}^i$$

of the (t−1)-th image frame is $$m^i_{-2\to-1},$$

the motion parameter between the image block $$x^i_{t+1}$$

of the (t+1)-th image frame and the image block $$x^i_{t+2}$$

of the (t+2)-th image frame is $$m^i_{2\to1},$$

and the preset threshold is γ. The first super-resolution network model is $$L^i_1,$$

the second super-resolution network model is $$L^i_2,$$

and the third super-resolution network model is $$L^i_3,$$

then the above steps 1 to 5 may be represented as follows:

$$L^i_j = \begin{cases} L^i_1; & m^i_{-1\to0} < \gamma,\ m^i_{1\to0} < \gamma \\ L^i_2; & m^i_{-1\to0} > \frac{\gamma \text{ and}}{\text{or}} m^i_{-1\to0} > \gamma,\ m^i_{-1\to0} < \gamma,\ m^i_{1\to0} < \gamma \\ L^i_3; & \text{otherwise} \end{cases}$$

The method comprises Step S15, performing super-resolution on the image blocks of the t-th image frame in the image block sequences by using the super-resolution network models corresponding to the image block sequences, to obtain super-resolution image blocks of the t-th image frame.

Specifically, since one super-resolution image block of the t-th image frame can be obtained according to each image block sequence, and there are N image block sequences in total, N super-resolution image blocks in total of the t-th image frame can be obtained.

The method comprises Step S16, generating a super-resolution image frame of the t-th image frame according to the super-resolution image blocks of the t-th image frame.

As an optional implementation of the embodiment of the present disclosure, when the adjacent image blocks in the image blocks obtained by decomposing the t-th image frame and the neighboring image frame do not have an overlapping area, the above step S16 (generating a super-resolution image frame of the t-th image frame according to the super-resolution image blocks of the t-th image frame) comprises:

stitching the super-resolution image blocks of the t-th image frame into the super-resolution image frame of the t-th image frame.

As an optional implementation of the embodiment of the present disclosure, when the adjacent image blocks in the image blocks obtained by decomposing the t-th image frame and the adjacent image frames have overlapping areas, the above step S16 (generating a super-resolution image frame of the t-th image frame according to the super-resolution image blocks of the t-th image frame) comprises:

stitching the super-resolution image blocks of the t-th image frame to generate a stitched image; and setting a pixel value of a pixel in an overlapping area of the super-resolution image blocks in the stitched image as an average value of pixel values of corresponding pixels in the super-resolution image blocks, to generate the super-resolution image frame of the t-th image frame.

Figure 4:
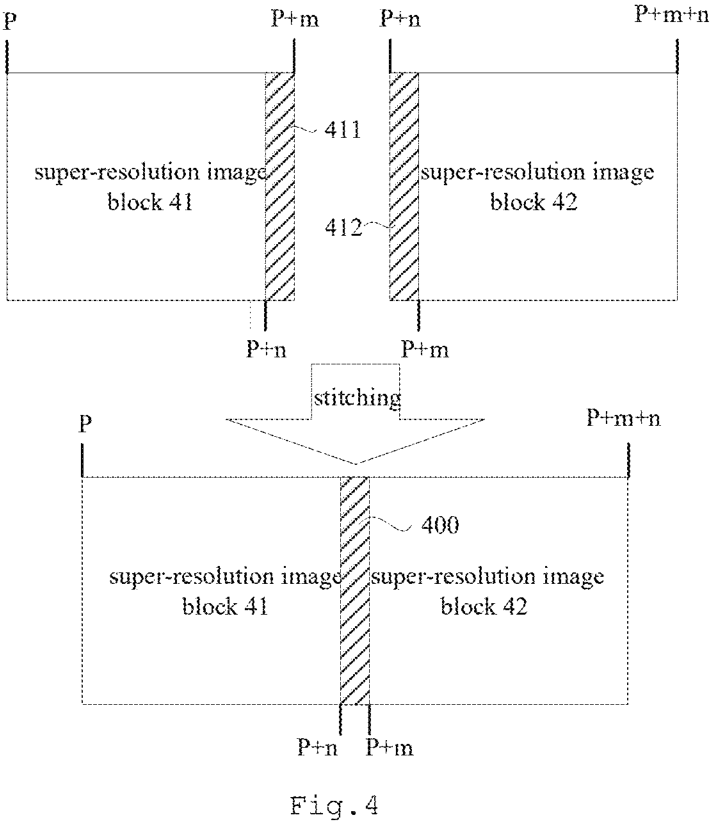
FIG. 4 is a schematic diagram of an image block mode according to an embodiment of the present disclosure.

Exemplarily, referring to FIG. 4, in FIG. 4, a starting pixel column of a super-resolution image block 41 is a P-th column, an ending pixel column of the super-resolution image block 41 is a (P+m)-th column, a starting pixel column of a super-resolution image block 42 is a (P+n)-th column, and an ending pixel column of the super-resolution image block 42 is a (P+m+n)-th column, when the super-resolution image block 41 and the super-resolution image block 42 are stitched, an area 411 of the super-resolution image block 41 will be overlapped with an area 412 of the super-resolution image block 42, and therefore a pixel value of any pixel in an overlapping area 400 is an average value of corresponding pixels in the area 411 and the area 412. For example: a pixel value of a pixel (x1, y1) in the overlapping area 400 is an average value of a pixel value of a pixel (x1, y1) in the area 411 and a pixel value of a pixel (x1, y1) in the area 412.

Figure 5:
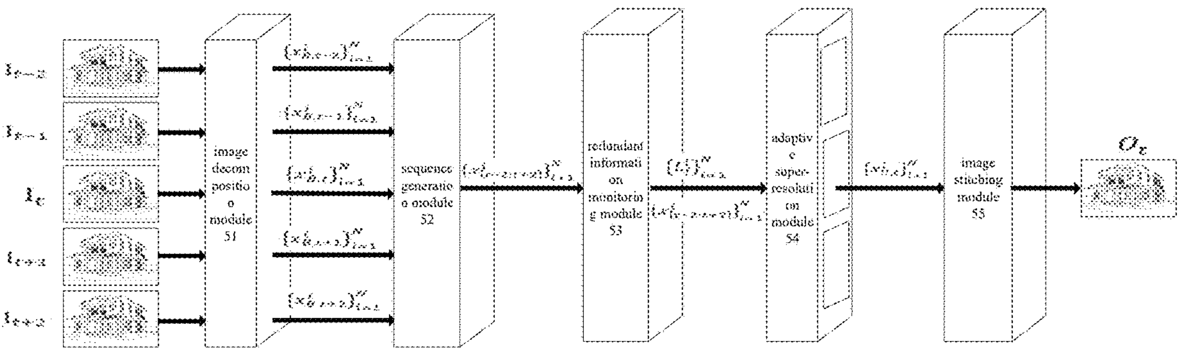
FIG. 5 is a schematic diagram of a model for implementing a super-resolution method according to an embodiment of the present disclosure.

Referring to FIG. 5, FIG. 5 is a schematic structural diagram of a video super-resolution network for implementing the above video super-resolution method. The video super-resolution network for implementing the video super-resolution method comprises: an image decomposition module 51, a sequence generation module 52, a redundant information monitoring module 53, an adaptive super-resolution module 54, and an image stitching module 55.

The image decomposition module 51 is configured to decompose a (t−2)-th image frame $I_{t-2}$ into N image blocks $$\{x^i_{B,t-2}\}^N_{i=1},$$

decompose a (t−1)-th image frame $I_{t-1}$ into N image blocks $$\{x^i_{B,t-1}\}^N_{i=1},$$

decompose a t-th image frame $I_t$ into N image blocks $$\{x^i_{B,t}\}^N_{i=1},$$

decompose a (t+1)-th image frame $I_{t+1}$ into N image blocks $$\{x_{B,t+1}^i\}_{i=1}^N,$$

and decompose a (t+2)-th image frame $I_{t+2}$ into N image blocks $$\{x_{B,t+2}^i\}_{i=1}^N.$$

The sequence generation module 52 is configured to generate N image block sequences $$\{x_{[t-2:t+2]}^i\}_{i=1}^N$$

according to $$\{x_{B,t-2}^i\}_{i=1}^N, \{x_{B,t-1}^i\}_{i=1}^N, \{x_{B,t}^i\}_{i=1}^N, \{x_{B,t+1}^i\}_{i=1}^N, \{x_{B,t+2}^i\}_{i=1}^N.$$

The redundant information monitoring module 53 is configured to calculate motion parameters of the image block sequences $$\{x_{[t-2:t+2]}^i\}_{i=1}^N,$$

and determine super-resolution network models $$\{L_j^i\}_{i=1}^N$$

of the image block sequences according to the motion parameters of the image block sequences $$\{x_{[t-2:t+2]}^i\}_{i=1}^N.$$

The adaptive super-resolution module 54 comprises the super-resolution network models corresponding to the image block sequences, and is configured to perform super-resolution on the image blocks of the t-th image frame in the image block sequences by using the super-resolution network models corresponding to the image block sequences, to obtain super-resolution image blocks $$\{x_{U,t}^i\}_{i=1}^N$$

of the t-th image frame.

The image stitching module 55 is configured to generate a super-resolution image frame $O_t$ of the t-th image frame according to the super-resolution image blocks $$\{x_{U,t}^i\}_{i=1}^N$$

of the t-th image frame.

According to the video super-resolution method provided in the embodiment of the present disclosure, when super-resolution is performed on an image of a t-th image frame, firstly, the t-th image frame of a video to be super-resolved and a neighborhood image frame of the t-th image frame are respectively decomposed into N image blocks, and N image block sequences are generated according to the image blocks obtained by decomposing the t-th image frame and the neighborhood image frame, then motion parameters of the image block sequences are calculated, and then super-resolution network models corresponding to the image block sequences are determined according to the motion parameters of the image block sequences, super-resolution is performed on the image blocks of the t-th image frame in the image block sequences by using the super-resolution network models corresponding to the image block sequences to obtain super-resolution image blocks of the t-th image frame, and a super-resolution image frame of the t-th image frame is generated according to the super-resolution image blocks of the t-th image frame. Since when super-resolution is performed on the t-th image frame image according to the video super-resolution method provided in the embodiment of the present disclosure, the super-resolution network model corresponding to each image block sequence can be determined according to the motion parameters of the image block sequences, and super-resolution is performed by adaptively using different super-resolution network models for different situations, the video super-resolution effect can be improved by the video super-resolution method provided in the embodiment of the present disclosure.

Figure 6:
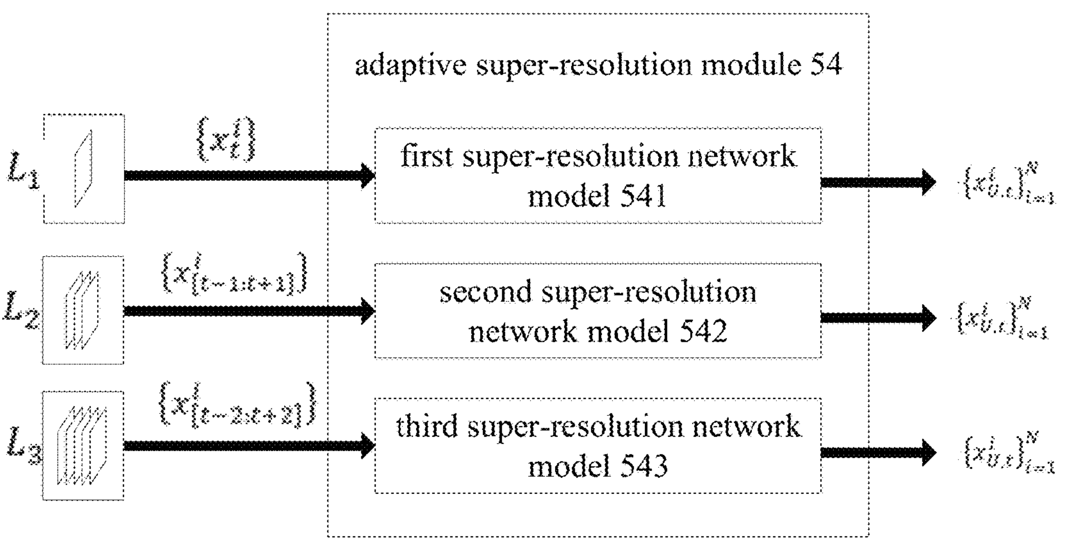
FIG. 6 is a schematic diagram of an adaptive super-resolution module according to an embodiment of the present disclosure.

Exemplarily, referring to FIG. 6, an adaptive super-resolution module 54 shown in FIG. 6 comprises a first super-resolution network model 541, a second super-resolution network model 542, and a third super-resolution network model 543. The first super-resolution network model 541, when performing super-resolution on the image block of the t-th image frame, will use the image block {x_t^i} of the t-th image frame; the second super-resolution network model 542, when performing super-resolution on the image block of the t-th image frame, will use the image blocks {x_[t−1:t+1]^i} of the (t−1)-th image frame, the t-th image frame and the (t+1)-th image frame; and the third super-resolution network model 543, when performing super-resolution on the image block of the t-th image frame, will use all the image blocks {x_[t−2:t+2]^i} in the image block sequence.

Figure 7:
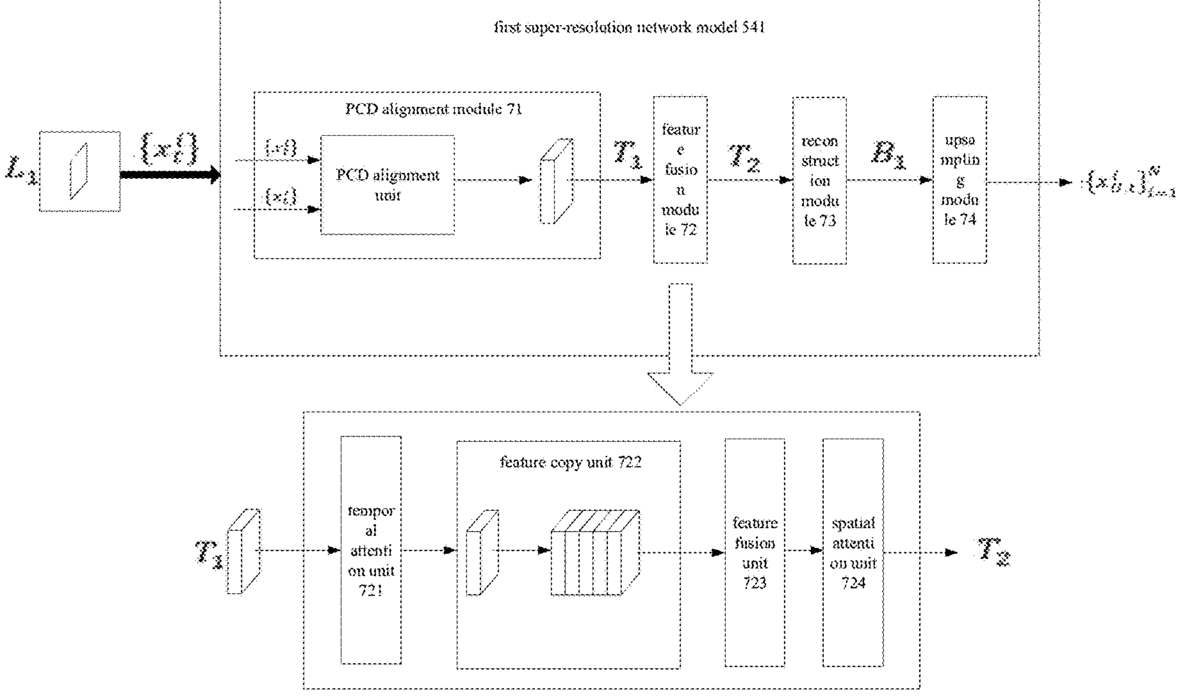
FIG. 7 is a schematic diagram of a first super-resolution network model according to an embodiment of the present disclosure.

As an optional implementation of the embodiment of the present disclosure, referring to a schematic model structure diagram of a first super-resolution network model shown in FIG. 7, an implementation of performing, by the first super-resolution network model, super-resolution on the image block of the t-th image frame comprises the following steps I to IV:

step I, processing, by a pyramid cascading and deformable convolutions (PCD) alignment module 71, the image block $$\{x_t^i\}$$

of the t-th image frame to obtain a first feature $T_1$.

Referring to FIG. 7, an input of the PCD alignment module 71 is two image blocks, whereas the input of the PCD alignment module in the above step I comprises only one image block (the image block of the t-th image frame), so that a copy of the image block of the t-th image frame can be made and used as an input to the PCD alignment module together with an original image block.

The method comprises Step II, processing, by a feature fusion module 72, the first feature to obtain a second feature $T_2$.

The second feature is a feature obtained by stitching five first features in a channel dimension. It should be appreciated by those skilled in the art that the second feature can be a feature obtained by stitching a plurality of the first features in the channel dimension, the number of the first features configured for stitching being not limited herein.

That is, assuming that a tensor of the first feature is C*H*W, and a tensor of the second feature is 5*C*H*W. C is the number of channels of the first feature, H is a length of the first feature, and W is a width of the first feature.

Exemplarily, referring to FIG. 7, the feature fusion module 72 may comprise a temporal attention unit 721, a feature copy unit 722, a feature fusion unit 723, and a spatial attention unit 724. The feature copy unit 722 is configured to copy the first feature 4 times and stitch it with the original first feature.

The method comprises Step III, reconstructing, by a reconstruction module 73, the second feature $T_2$ to obtain a first image block $B_1$.

The method comprises Step IV, upsampling, by an upsampling module 74, the first image block $B_1$ to obtain the super-resolution image blocks $$\{x_{U,t}^i\}_{i=1}^N$$

corresponding to the image blocks of the t-th image frame.

Figure 8:
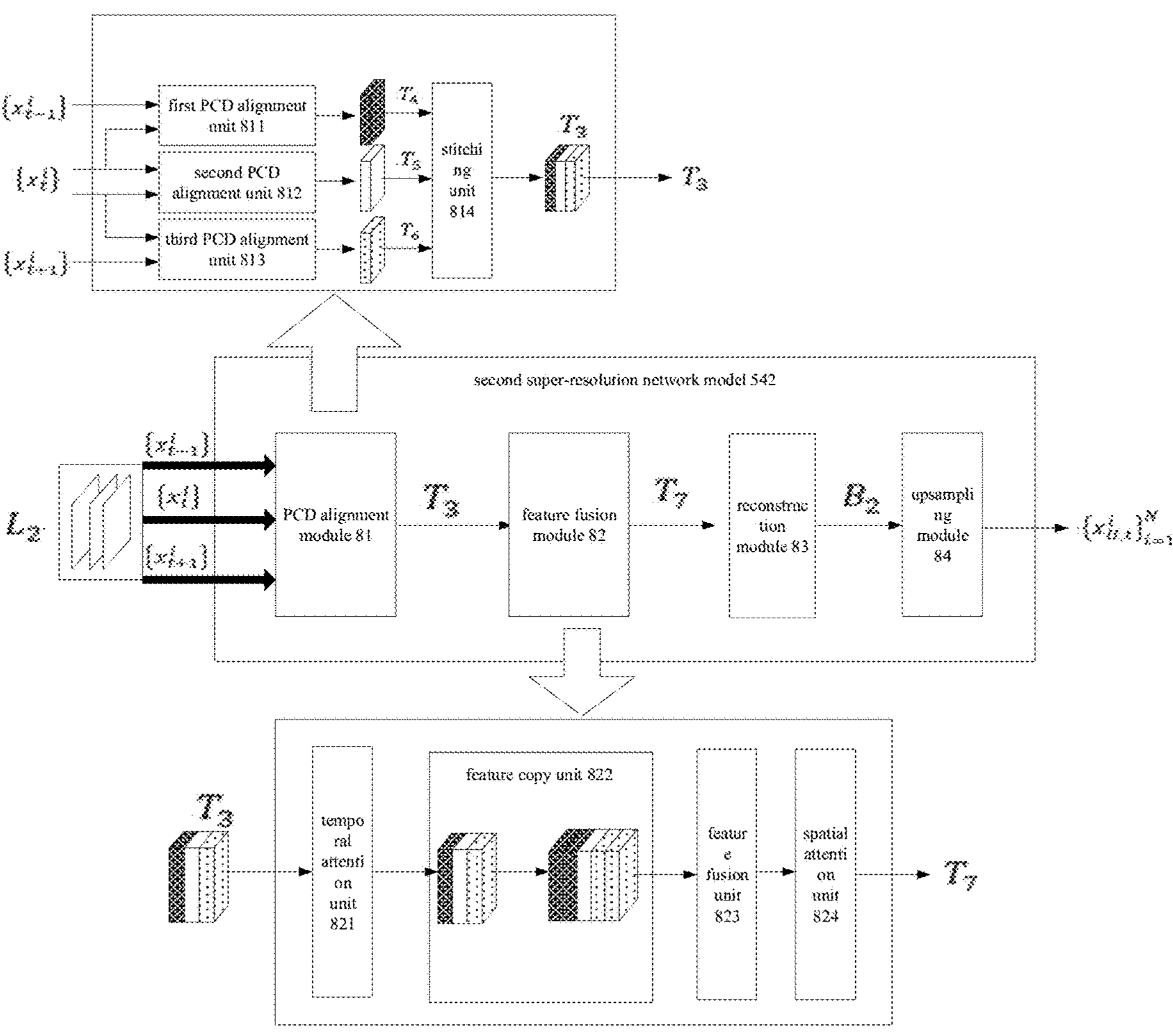
FIG. 8 is a schematic diagram of a second super-resolution network model according to an embodiment of the present disclosure.

As an optional implementation of the embodiment of the present disclosure, referring to a schematic model structure diagram of a second super-resolution network model shown in FIG. 8, an implementation of performing, by the second super-resolution network model, super-resolution on the image block of the t-th image frame comprises the following steps i to iv:

step i, processing, by a PCD alignment module 81, the image block $$\{x_{t-1}^i\}$$

of the (t−1)-th image frame, the image block $$\{x_t^i\}$$

of the t-th image frame and the image block $$\{x_{t+1}^i\}$$

of the (t+1)-th image frame to obtain a third feature $T_3$.

The third feature $T_3$ is a feature obtained by stitching a fourth feature $T_4$, a fifth feature $T_5$ and a sixth feature $T_6$ in a channel dimension, the fourth feature $T_4$ being a feature obtained by processing, by the PCD alignment module, the image block $$\{x_{t-1}^i\}$$

of the (t−1)-th image frame and the image block $$\{x_t^i\}$$

of the t-th image frame, the fifth feature $T_5$ being a feature obtained by processing, by the PCD alignment module, the image block $$\{x_t^i\}$$

of the t-th image frame, and the sixth feature being a feature obtained by processing, by the PCD alignment module, the image block $$\{x_t^i\}$$

of the t-th image frame and the image block $$\{x_{t+1}^i\}$$

of the (t+1)-th image frame.

Referring to FIG. 8, the PCD alignment module 81 comprises a first PCD alignment unit 811, a second PCD alignment unit 812, a third PCD alignment unit 813, and a stitching unit 814. The first PCD alignment unit 811 is configured to process the image block $$\{x_{t-1}^i\}$$

of the (t−1)-th image frame and the image block $$\{x_t^i\}$$

of the t-th image frame to obtain the fourth feature $T_4$; the second PCD alignment unit 812 is configured to process the image block $$\{x_t^i\}$$

of the t-th image frame to obtain the fifth feature $T_5$; the third PCD alignment unit 813 is configured to process the image block $$\{x_t^i\}$$

of the t-th image frame and the image block $$\{x_{t+1}^{i}\}$$

of the (t+1)-th image frame to obtain the fifth feature $T_6$; and the stitching unit 814 is configured to stitch the fourth feature $T_4$, the fifth feature $T_5$ and the sixth feature $T_6$ to obtain the third feature $T_3$.

The method comprises Step ii, processing, by a feature fusion module 82, the third feature $T_3$ to obtain a seventh feature $T_7$.

The seventh feature $T_7$ is a feature obtained by stitching the fourth feature $T_4$, the third feature $T_3$ and the fifth feature $T_5$ in a channel dimension.

Exemplarily, referring to FIG. 8, the feature fusion module 82 may comprise a temporal attention unit 821, a feature copy unit 822, a feature fusion unit 823, and a spatial attention unit 824. The feature copy unit 822 is configured to copy the fourth feature $T_4$ and the fifth feature $T_5$ in the third feature $T_3$ once and stitch them with the third feature $T_3$.

The method comprises Step iii, reconstructing, by a reconstruction module 83, the seventh feature $T_7$ to obtain a second image block $B_2$.

The method comprises Step iv, upsampling, by an upsampling module 84, the second image block $B_2$ to obtain the super-resolution image blocks $$\{x_{U,t}^{i}\}_{i=1}^{N}$$

corresponding to the image blocks of the t-th image frame.

Figure 9:
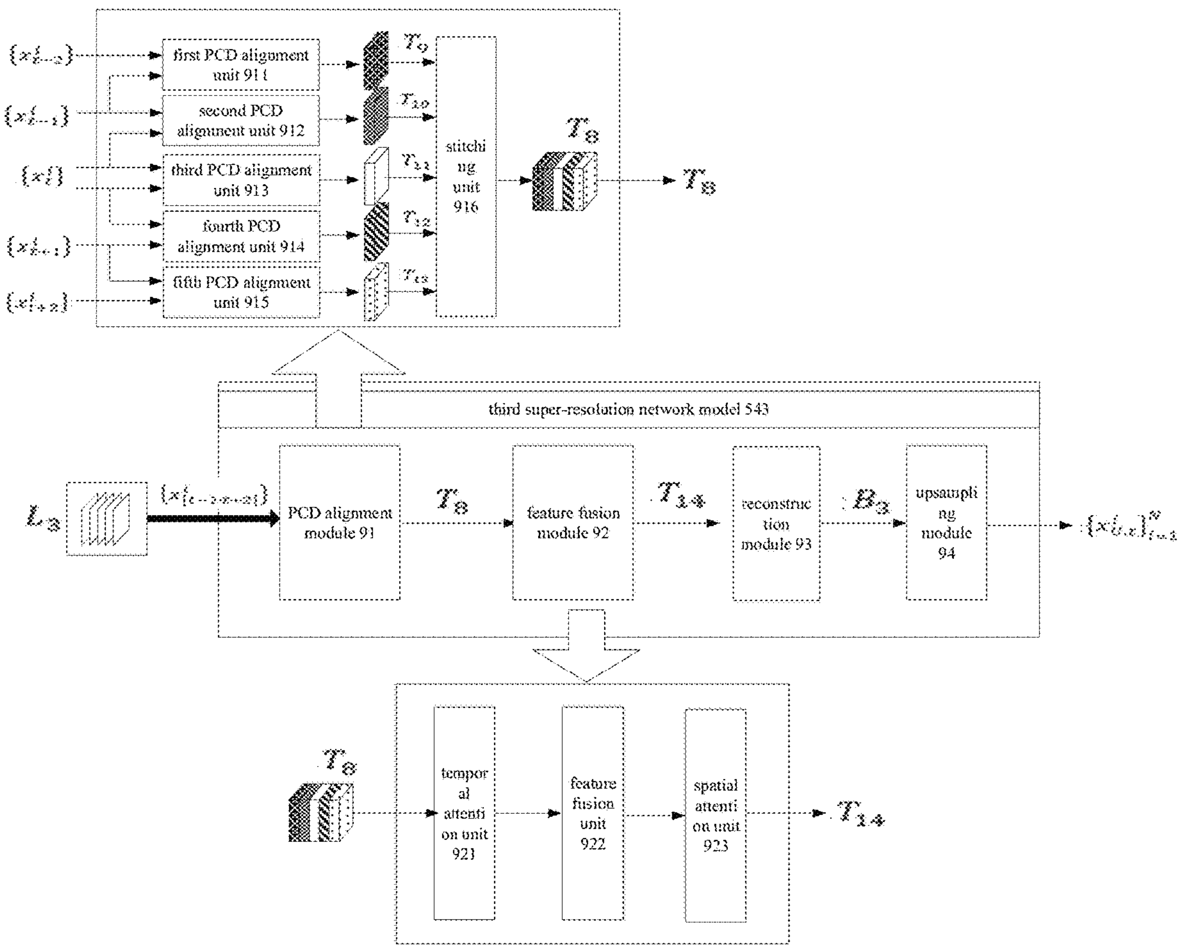
FIG. 9 is a schematic diagram of a third super-resolution network model according to an embodiment of the present disclosure.

As an optional implementation of the embodiment of the present disclosure, referring to a schematic model structural diagram of a third super-resolution network model shown in FIG. 9, performing, by the third super-resolution network model, super-resolution on the image block of the t-th image frame in the image block sequence comprises the following steps ① to ④:

step ①, processing, by a PCD alignment module 91, all the image blocks in the image block sequences $$\{x_{[t-2:t+2]}^{i}\}_{i=1}^{N}$$

to obtain an eighth feature $T_8$.

The eighth feature $T_8$ is a feature obtained by stitching a ninth feature $T_9$, a tenth feature $T_{10}$, an eleventh feature $T_{11}$, a twelfth feature $T_{12}$ and a thirteenth feature $T_{13}$ in a channel dimension, the ninth feature $T_9$ being a feature obtained by processing, by the PCD alignment module, the image block $$\{x_{t-2}^{i}\}$$

of the (t−2)-th image frame and the image block $$\{x_{t-1}^{i}\}$$

of the (t−1)-th image frame, the tenth feature being a feature obtained by processing, by the PCD alignment module, the image block $$\{x_{t-1}^{i}\}$$

of the (t−1)-th image frame and the image block $$\{x_{t}^{i}\}$$

of the t-th image frame, the eleventh feature being a feature obtained by processing, by the PCD alignment module, the image block $$\{x_{t}^{i}\}$$

of the t-th image frame, the twelfth feature being a feature obtained by processing, by the PCD alignment module, the image block $$\{x_{t}^{i}\}$$

of the t-th image frame and the image block $$\{x_{t+1}^{i}\}$$

of the (t+1)-th image frame, the thirteenth feature being a feature obtained by processing, by the PCD alignment module, the image block $$\{x_{t+1}^{i}\}$$

of the (t+1)-th image frame and the image block $$\{x_{t+2}^{i}\}$$

of the (t+2)-th image frame.

Exemplarily, referring to FIG. 9, the PCD alignment module 91 comprises a first PCD alignment unit 911, a second PCD alignment unit 912, a third PCD alignment unit 913, a fourth PCD alignment unit 914, a fifth PCD alignment unit 915, and a stitching unit 916. The first PCD alignment unit 911 is configured to process the image block $$\{x_{t-2}^{i}\}$$

of the (t−2)-th image frame and the image block $$\{x_{t-1}^{i}\}$$

of the (t−1)-th image frame to obtain the ninth feature $T_9$; the second PCD alignment unit 912 is configured to process the image block $$\{x_{t-1}^i\}$$

of the (t−1)-th image frame and the image block $$\{x_t^i\}$$

of the t-th image frame to obtain the tenth feature $T_{10}$; the third PCD alignment unit 913 is configured to process the image block $$\{x_t^i\}$$

of the t-th image frame to obtain the eleventh feature $T_{11}$; the fourth PCD alignment unit 915 is configured to process the image block $$\{x_t^i\}$$

of the t-th image frame and the image block $$\{x_{t+1}^i\}$$

of the (t+1)-th image frame to obtain the twelfth feature $T_{12}$; the fifth PCD alignment unit 915 is configured to process the image block $$\{x_{t+1}^i\}$$

of the (t+1)-th image frame and the image block $$\{x_{t+2}^i\}$$

of the (t+2)-th image frame to obtain the thirteenth feature $T_{13}$; and the stitching unit 916 is configured to stitch the ninth feature $T_9$, the tenth feature $T_{10}$, the eleventh feature $T_{11}$, the twelfth feature $T_{12}$ and the thirteenth feature $T_{13}$ to obtain the eighth feature $T_8$.

The method comprises Step ②, processing, by a feature fusion module 92, the eighth feature $T_8$ to obtain a fourteenth feature $T_{14}$.

Exemplarily, referring to FIG. 9, the feature fusion module 92 may comprise a temporal attention unit 921, a feature fusion unit 922, and a spatial attention unit 923.

The method comprises Step ③, reconstructing, by a reconstruction module 93, the fourteenth feature $T_{14}$ to obtain a third image block $B_3$.

The method comprises Step ④, upsampling, by an upsampling module 94, the third image block $B_3$ to obtain the super-resolution image blocks $$\{x_{U,t}^i\}_{i=1}^N$$

corresponding to the image blocks of the t-th image frame in the image block sequences.

Based on the same inventive concept, as an implementation of the above method, an embodiment of the present disclosure further provides a video super-resolution apparatus, which corresponds to the foregoing method embodiment, and for convenience of reading, details in the foregoing method embodiment are not repeated in this apparatus embodiment one by one, but it should be clear that the video super-resolution apparatus in this embodiment can correspondingly implement all contents in the foregoing method embodiment.

Figure 10:
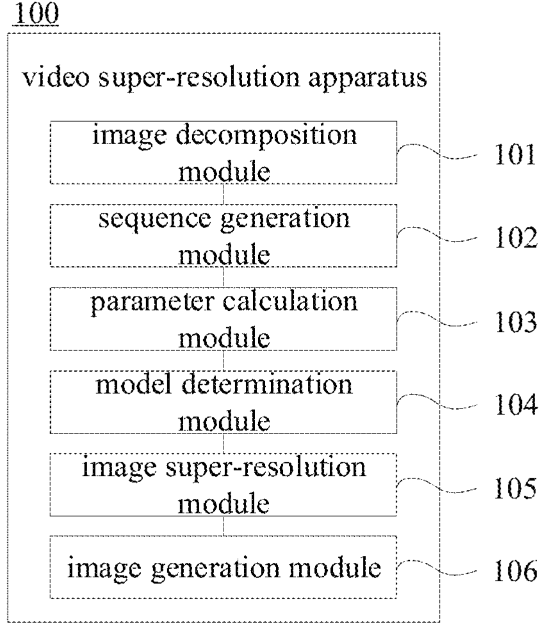
FIG. 10 is a schematic diagram of a video super-resolution apparatus according to an embodiment of the present disclosure.

An embodiment of the present disclosure provides a video super-resolution apparatus. FIG. 10 is a schematic structural diagram of the video super-resolution apparatus, as shown in FIG. 10, the video super-resolution apparatus 100 comprising:

- an image decomposition module 101 configured to decompose a t-th image frame of a video to be super-resolved and a neighborhood image frame of the t-th image frame, into N image blocks, respectively, t and N being both positive integers;
- a sequence generation module 102 configured to generate N image block sequences according to the image blocks obtained by decomposing the t-th image frame and the neighborhood image frame, image blocks in the image block sequence being located at same positions of different image frames, respectively;
- a parameter calculation module 103 configured to calculate motion parameters of the image block sequences, motion parameters of any image block sequence being configured for representing optical flows between image blocks of adjacent image frames in the image block sequence;
- a model determination module 104 configured to determine super-resolution network models corresponding to the image block sequences according to the motion parameters of the image block sequences;
- an image super-resolution module 105 configured to perform super-resolution on the image blocks of the t-th image frame in the image block sequences by using the super-resolution network models corresponding to the image block sequences, to obtain super-resolution image blocks of the t-th image frame; and
- an image generation module 106 configured to generate a super-resolution image frame of the t-th image frame according to the super-resolution image blocks of the t-th image frame.

As an optional implementation of the embodiment of the present disclosure, the parameter calculation module 103 is specifically configured to calculate, for each image block sequence, the optical flows between the image blocks of the adjacent image frames in the image block sequence; calculate, for an optical flow between image blocks of each pair of adjacent image frames, an average value of absolute values of optical flows corresponding to pixels to obtain a motion parameter between the image blocks of the adjacent image frames; and obtain the motion parameters of the image block sequence according to the motion parameters between the image blocks of the adjacent image frames in the image block sequence.

As an optional implementation of the embodiment of the present disclosure, the neighborhood image frame of the t-th image frame comprises:

a (t−2)-th image frame, a (t−1)-th image frame, a (t+1)-th image frame and a (t+2)-th image frame of the video to be super-resolved.

As an optional implementation of the embodiment of the present disclosure, the model determination module 104 is specifically configured to determine, for each image block sequence, whether a first motion parameter and a second motion parameter of the image block sequence are both less than a preset threshold, the first motion parameter being a motion parameter between the image block of the t-th image frame and the image block of the (t−1)-th image frame, and the second motion parameter being a motion parameter between the image block of the t-th image frame and the image block of the (t+1)-th image frame; if the first motion parameter and the second motion parameter are both less than the preset threshold, determine that the super-resolution network model corresponding to the image block sequence is a first super-resolution network model; if the first motion parameter and/or the second motion parameter are/is greater than or equal to the preset threshold, determine whether a third motion parameter and a fourth motion parameter of the image block sequence are both less than the preset threshold, the third motion parameter being a motion parameter between the image block of the (t−2)-th image frame and the image block of the (t−1)-th image frame, and the fourth motion parameter being a motion parameter between the image block of the (t+1)-th image frame and the image block of the (t+2)-th image frame; if the third motion parameter and the fourth motion parameter are both less than the preset threshold, determine that the super-resolution network model corresponding to the image block sequence is a second super-resolution network model; and if the third motion parameter and/or the fourth motion parameter are/is greater than or equal to the preset threshold, determine that the super-resolution network model corresponding to the image block sequence is a third super-resolution network model.

As an alternative implementation of the embodiment of the present disclosure, the first super-resolution network model is a single-frame super-resolution network model;

the second super-resolution network model is configured for performing super-resolution on the image block of the t-th image frame based on the image block of the (t−1)-th image frame, the image block of the t-th image frame and the image block of the (t+1)-th image frame;

the third super-resolution network model is configured for performing super-resolution on the image block of the t-th image frame based on all the image blocks in the image block sequence.

As an optional implementation of the embodiment of the present disclosure, the image super-resolution module 105 is specifically configured to process, by a pyramid cascading and deformable convolutions (PCD) alignment module, the image block of the t-th image frame to obtain a first feature; process, by a feature fusion module, the first feature to obtain a second feature, the second feature being a feature obtained by stitching five first features in a channel dimension; reconstruct, by a reconstruction module, the second feature to obtain a first image block; and upsampling, by an upsampling module, the first image block to obtain a super-resolution image block corresponding to the image block of the t-th image frame.

As an optional implementation of the embodiment of the present disclosure, the image super-resolution module 105 is specifically configured to process, by a PCD alignment module, the image block of the (t−1)-th image frame, the image block of the t-th image frame, and the image block of the (t+1)-th image frame to obtain a third feature, the third feature being a feature obtained by stitching a fourth feature, a fifth feature and a sixth feature in a channel dimension, the fourth feature being a feature obtained by processing, by the PCD alignment module, the image block of the (t−1)-th image frame and the image block of the t-th image frame, the fifth feature being a feature obtained by processing, by the PCD alignment module, the image block of the t-th image frame, and the sixth feature being a feature obtained by processing, by the PCD alignment module, the image block of the t-th image frame and the image block of the (t+1)-th image frame; process, by a feature fusion module, the third feature to obtain a seventh feature, the seventh feature being a feature obtained by stitching the fourth feature, the third feature and the fifth feature in a channel dimension; reconstruct, by a reconstruction module, the seventh feature to obtain a second image block; and upsample, by an upsampling module, the second image block to obtain a super-resolution image block corresponding to the image block of the t-th image frame.

As an optional implementation of the embodiment of the present disclosure, the image super-resolution module 105 is specifically configured to process, by a PCD alignment module, all the image blocks in the image block sequence to obtain an eighth feature, the eighth feature being a feature obtained by stitching a ninth feature, a tenth feature, an eleventh feature, a twelfth feature and a thirteenth feature in a channel dimension, the ninth feature being a feature obtained by processing, by the PCD alignment module, the image block of the (t−2)-th image frame and the image block of the (t−1)-th image frame, the tenth feature being a feature obtained by processing, by the PCD alignment module, the image block of the (t−1)-th image frame and the image block of the t-th image frame, the eleventh feature being a feature obtained by processing, by the PCD alignment module, the image block of the t-th image frame, the twelfth feature being a feature obtained by processing, by the PCD alignment module, the image block of the t-th image frame and the image block of the (t+1)-th image frame, and the thirteenth feature being a feature obtained by processing, by the PCD alignment module, the image block of the (t+1)-th image frame and the image block of the (t+2)-th image frame; process, by a feature fusion module, the eighth feature to obtain a fourteenth feature; reconstruct, by a reconstruction module, the fourteenth feature to obtain a third image block; and upsample, by an upsampling module, the third image block to obtain a super-resolution image block corresponding to the image block of the t-th image frame in the image block sequence.

As an optional implementation of the embodiment of the present disclosure, adjacent image blocks in the image blocks obtained by decomposing the t-th image frame and the adjacent image frame have an overlapping area; and the image generation module 106 is specifically configured to stitch the super-resolution image blocks of the t-th image frame to generate a stitched image; and set a pixel value of each pixel in an overlapping area of the super-resolution image blocks in the stitched image as an average value of pixel values of corresponding pixels in the super-resolution image blocks, to generate the super-resolution image frame of the t-th image frame.

The above modules may be implemented as software components executed on one or more general-purpose processors, or as hardware performing certain functions or combinations thereof, such as a programmable logic device and/or application specific integrated circuit. In some embodiments, these modules may be embodied in a form of a software product that may be stored in a non-volatile storage medium including instructions that cause a computer device (e.g., a personal computer, server, network device, mobile terminal, etc.) to implement the method described in the embodiments of the present disclosure. In other embodiments, the above modules may also be implemented on a single device or distributed across a plurality of devices. The functions of these modules may be combined with each other, or further divided into a plurality of sub-modules.

The video super-resolution apparatus provided in this embodiment may perform the video super-resolution method provided in the above method embodiment, and have similar implementation principles and technical effects, which are not repeated here.

Figure 11:
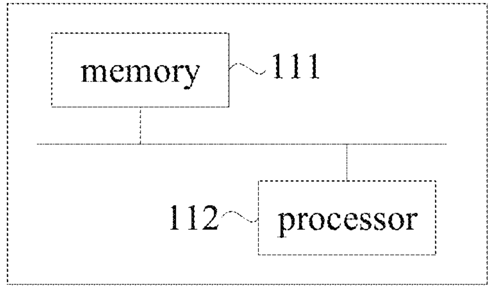
FIG. 11 is a schematic hardware structural diagram of an electronic device according to an embodiment of the present disclosure.

Based on the same inventive concept, an embodiment of the present disclosure further provides an electronic device. FIG. 11 is a schematic structural diagram of an electronic device according to an embodiment of the present disclosure, as shown in FIG. 11, the electronic device provided in this embodiment comprising: a memory 111 and a processor 112, the memory 111 being configured to store a computer program; and the processor 112 being configured to when calling the computer program, perform the video super-resolution method provided in the above embodiment.

Based on the same inventive concept, an embodiment of the present disclosure further provides a computer-readable storage medium having thereon stored a computer program which, when executed by a processor, causes the computing device to implement the video super-resolution method provided in the above embodiment.

Based on the same inventive concept, an embodiment of the present disclosure further provides a computer program product, which when run on a computer, causes the computing device to implement the video super-resolution method provided in the above embodiment.

Based on the same inventive concept, an embodiment of the present disclosure further provides a computer program, comprising instructions which, when executed by a processor, cause the processor to perform the video super-resolution method provided in the above embodiment.

It should be appreciated by those skilled in the art that, the embodiments of the present disclosure may be provided as a method, system, or computer program product. Therefore, the present disclosure may take a form of an entire hardware embodiment, an entire software embodiment, or an embodiment combining software and hardware aspects. Moreover, the present disclosure may take a form of a computer program product implemented on one or more computer-usable storage media having computer-usable program code embodied therein.

The processor may be a central processing unit (CPU), or another general purpose processor, a digital signal processor (DSP), an application specific integrated circuit (ASIC), a field-programmable gate array (FPGA) or other programmable logic device, a discrete gate or transistor logic device, a discrete hardware component, etc. The general purpose processor may be a microprocessor, or the processor may also be any conventional processor, etc.

The memory may include a non-permanent memory in a computer-readable medium, such as a random access memory (RAM), and/or a non-volatile memory, such as a read-only memory (ROM) or flash memory (flash RAM). The memory is an example of the computer-readable medium.

The computer-readable medium includes permanent and non-permanent, removable and non-removable storage media. The storage medium may implement storage of information by any method or technology, and the information may be computer-readable instructions, data structures, modules of a program, or other data. Examples of the storage medium of a computer include, but are not limited to, a phase change memory (PRAM), static random access memory (SRAM), dynamic random access memory (DRAM), other type of random access memory (RAM), read-only memory (ROM), electrically erasable programmable read-only memory (EEPROM), flash memory or other memory technology, compact disc read-only memory (CD-ROM), digital versatile disks (DVD) or other optical storage, magnetic cassette, magnetic disk storage or other magnetic storage device, or any other non-transmission medium, which can be configured for storing information that can be accessed by the computing device. As defined herein, the computer-readable medium does not include transitory media such as modulated data signals and carriers.

Finally, it should be noted that: the above embodiments are only configured for illustrating the technical solutions of the present disclosure, and not for limiting the same; although the detailed description of the present disclosure has been made with reference to the foregoing embodiments, one of ordinary skill in the art should understand that: the technical solutions described in the foregoing embodiments may still be modified, or some or all of the technical features thereof may be equivalently substituted; and these modifications or substitutions do not make the essence of the corresponding technical solutions depart from the scope of the technical solutions of the embodiments of the present disclosure.

What is claimed is:

1. A video super-resolution method, comprising:

decomposing a t-th image frame of a video to be super-resolved and a neighborhood image frame of the t-th image frame, into N image blocks, respectively, both t and N being positive integers;

generating N image block sequences according to the image blocks obtained by decomposing the t-th image frame and the neighborhood image frame, image blocks in the image block sequence being located at same positions of different image frames, respectively;

calculating motion parameters of the image block sequences, motion parameters of any image block sequence being configured for representing optical flows between image blocks of adjacent image frames in the image block sequence;

determining super-resolution network models corresponding to the image block sequences according to the motion parameters of the image block sequences;

performing super-resolution on the image blocks of the t-th image frame in the image block sequences by using the super-resolution network models corresponding to the image block sequences, to obtain super-resolution image blocks of the t-th image frame; and generating a super-resolution image frame of the t-th image frame according to the super-resolution image blocks of the t-th image frame.

2. The video super-resolution method according to claim 1, wherein the calculating motion parameters of the image block sequences, comprises:

calculating, for each image block sequence, the optical flows between the image blocks of the adjacent image frames in the image block sequence;

calculating, for an optical flow between image blocks of each pair of adjacent image frames, an average value of absolute values of optical flows corresponding to pixels, to obtain a motion parameter between the image blocks of the adjacent image frames; and obtaining the motion parameters of the image block sequence according to the motion parameters between the image blocks of the adjacent image frames in the image block sequence.

3. The video super-resolution method according to claim 1, wherein the neighborhood image frame of the t-th image frame comprises:

a (t−2)-th image frame, a (t−1)-th image frame, a (t+1)-th image frame and a (t+2)-th image frame.

4. The video super-resolution method according to claim 3, wherein the determining super-resolution network models corresponding to the image block sequences according to the motion parameters of the image block sequences, comprises:

determining, for each image block sequence, whether a first motion parameter and a second motion parameter of the image block sequence are both less than a preset threshold, the first motion parameter being a motion parameter between the image block of the t-th image frame and the image block of the (t−1)-th image frame, and the second motion parameter being a motion parameter between the image block of the t-th image frame and the image block of the (t+1)-th image frame;

determining that the super-resolution network model corresponding to the image block sequence is a first super-resolution network model in response to the first motion parameter and the second motion parameter being both less than the preset threshold;

determining whether a third motion parameter and a fourth motion parameter of the image block sequence are both less than the preset threshold in response to the first motion parameter and/or the second motion parameter being greater than or equal to the preset threshold, the third motion parameter being a motion parameter between the image block of the (t−2)-th image frame and the image block of the (t−1)-th image frame, and the fourth motion parameter being a motion parameter between the image block of the (t+1)-th image frame and the image block of the (t+2)-th image frame;

determining that the super-resolution network model corresponding to the image block sequence is a second super-resolution network model in response to the third motion parameter and the fourth motion parameter being both less than the preset threshold; and determining that the super-resolution network model corresponding to the image block sequence is a third super-resolution network model in response to the third motion parameter and/or the fourth motion parameter being greater than or equal to the preset threshold.

5. The video super-resolution method according to claim 4, wherein:

the first super-resolution network model is a single-frame super-resolution network model;

the second super-resolution network model is configured for performing super-resolution on the image block of the t-th image frame based on the image block of the (t−1)-th image frame, the image block of the t-th image frame and the image block of the (t+1)-th image frame;

the third super-resolution network model is configured for performing super-resolution on the image block of the t-th image frame based on all the image blocks in the image block sequence.

6. The video super-resolution method according to claim 5, wherein the performing, by the first super-resolution network model, super-resolution on the image block of the t-th image frame, comprises:

processing, by a pyramid cascading and deformable convolutions PCD alignment module, the image block of the t-th image frame to obtain a first feature;

processing, by a feature fusion module, the first feature to obtain a second feature, the second feature being a feature obtained by stitching a plurality of the first features in a channel dimension;

reconstructing, by a reconstruction module, the second feature to obtain a first image block; and upsampling, by an upsampling module, the first image block to obtain a super-resolution image block corresponding to the image block of the t-th image frame.

7. The video super-resolution method according to claim 6, wherein the second feature is a feature obtained by stitching five first features in a channel dimension.

8. The video super-resolution method according to claim 5, wherein the performing, by the second super-resolution network model, super-resolution on the image block of the t-th image frame, comprises:

processing, by a PCD alignment module, the image block of the (t−1)-th image frame, the image block of the t-th image frame, and the image block of the (t+1)-th image frame to obtain a third feature, the third feature being a feature obtained by stitching a fourth feature, a fifth feature and a sixth feature in a channel dimension, the fourth feature being a feature obtained by processing, by the PCD alignment module, the image block of the (t−1)-th image frame and the image block of the t-th image frame, the fifth feature being a feature obtained by processing, by the PCD alignment module, the image block of the t-th image frame, and the sixth feature being a feature obtained by processing, by the PCD alignment module, the image block of the t-th image frame and the image block of the (t+1)-th image frame;

processing, by a feature fusion module, the third feature to obtain a seventh feature, the seventh feature being a feature obtained by stitching the fourth feature, the third feature and the fifth feature in a channel dimension;

reconstructing, by a reconstruction module, the seventh feature to obtain a second image block; and upsampling, by an upsampling module, the second image block to obtain a super-resolution image block corresponding to the image block of the t-th image frame.

9. The video super-resolution method according to claim 5, wherein the performing, by the third super-resolution network model, super-resolution on the image block of the t-th image frame, comprises:

processing, by a PCD alignment module, all the image blocks in the image block sequence to obtain an eighth feature, the eighth feature being a feature obtained by stitching a ninth feature, a tenth feature, an eleventh feature, a twelfth feature and a thirteenth feature in a channel dimension, the ninth feature being a feature obtained by processing, by the PCD alignment module, the image block of the (t−2)-th image frame and the image block of the (t−1)-th image frame, the tenth feature being a feature obtained by processing, by the PCD alignment module, the image block of the (t−1)-th image frame and the image block of the t-th image frame, the eleventh feature being a feature obtained by processing, by the PCD alignment module, the image block of the t-th image frame, the twelfth feature being a feature obtained by processing, by the PCD alignment module, the image block of the t-th image frame and the image block of the (t+1)-th image frame, and the thirteenth feature being a feature obtained by processing, by the PCD alignment module, the image block of the (t+1)-th image frame and the image block of the (t+2)-th image frame;

processing, by a feature fusion module, the eighth feature to obtain a fourteenth feature;

reconstructing, by a reconstruction module, the fourteenth feature to obtain a third image block; and upsampling, by an upsampling module, the third image block to obtain a super-resolution image block corresponding to the image block of the t-th image frame in the image block sequence.

10. The video super-resolution method according to claim 1, wherein the adjacent image blocks in the image blocks obtained by decomposing the t-th image frame and the adjacent image frame have an overlapping area, and the generating a super-resolution image frame of the t-th image frame according to the super-resolution image blocks of the t-th image frame, comprises:

stitching the super-resolution image blocks of the t-th image frame to generate a stitched image; and setting a pixel value of each pixel in an overlapping area of the super-resolution image blocks in the stitched image as an average value of pixel values of corresponding pixels in the super-resolution image blocks, to generate the super-resolution image frame of the t-th image frame.

11. The video super-resolution method according to claim 1, wherein the decomposing a t-th image frame of a video to be super-resolved into N image blocks, comprises:

by a sampling window with a size of one image block sliding from a first pixel of the t-th image frame with a preset stride, sampling positions of the t-th image frame, and taking each sampling area of the sampling window as one image block to obtain the N image blocks.

12. An electronic device, comprising:

a memory and a processor, the memory being configured to store instructions; and the processor being configured to, when executing the instructions, cause the electronic device to implement a video super-resolution method, comprising:

decomposing a t-th image frame of a video to be super-resolved and a neighborhood image frame of the t-th image frame, into N image blocks, respectively, both t and N being positive integers;

generating N image block sequences according to the image blocks obtained by decomposing the t-th image frame and the neighborhood image frame, image blocks in the image block sequence being located at same positions of different image frames, respectively;

calculating motion parameters of the image block sequences, motion parameters of any image block sequence being configured for representing optical flows between image blocks of adjacent image frames in the image block sequence;

determining super-resolution network models corresponding to the image block sequences according to the motion parameters of the image block sequences;

performing super-resolution on the image blocks of the t-th image frame in the image block sequences by using the super-resolution network models corresponding to the image block sequences, to obtain super-resolution image blocks of the t-th image frame; and generating a super-resolution image frame of the t-th image frame according to the super-resolution image blocks of the t-th image frame.

13. The electronic device according to claim 12, wherein the calculating motion parameters of the image block sequences, comprises:

calculating, for each image block sequence, the optical flows between the image blocks of the adjacent image frames in the image block sequence;

calculating, for an optical flow between image blocks of each pair of adjacent image frames, an average value of absolute values of optical flows corresponding to pixels, to obtain a motion parameter between the image blocks of the adjacent image frames; and obtaining the motion parameters of the image block sequence according to the motion parameters between the image blocks of the adjacent image frames in the image block sequence.

14. The electronic device according to claim 12, wherein the neighborhood image frame of the t-th image frame comprises:

a (t−2)-th image frame, a (t−1)-th image frame, a (t+1)-th image frame and a (t+2)-th image frame.

15. The electronic device according to claim 14, wherein the determining super-resolution network models corresponding to the image block sequences according to the motion parameters of the image block sequences, comprises:

determining, for each image block sequence, whether a first motion parameter and a second motion parameter of the image block sequence are both less than a preset threshold, the first motion parameter being a motion parameter between the image block of the t-th image frame and the image block of the (t−1)-th image frame, and the second motion parameter being a motion parameter between the image block of the t-th image frame and the image block of the (t+1)-th image frame;

determining that the super-resolution network model corresponding to the image block sequence is a first super-resolution network model in response to the first motion parameter and the second motion parameter being both less than the preset threshold;

determining whether a third motion parameter and a fourth motion parameter of the image block sequence are both less than the preset threshold in response to the first motion parameter and/or the second motion parameter being greater than or equal to the preset threshold, the third motion parameter being a motion parameter between the image block of the (t−2)-th image frame and the image block of the (t−1)-th image frame, and the fourth motion parameter being a motion parameter between the image block of the (t+1)-th image frame and the image block of the (t+2)-th image frame;

determining that the super-resolution network model corresponding to the image block sequence is a second super-resolution network model in response to the third motion parameter and the fourth motion parameter being both less than the preset threshold; and determining that the super-resolution network model corresponding to the image block sequence is a third super-resolution network model in response to the third motion parameter and/or the fourth motion parameter being greater than or equal to the preset threshold.

16. A non-transitory computer-readable storage medium having thereon stored instructions which, when executed by a processor, implement a video super-resolution method, comprising:

decomposing a t-th image frame of a video to be super-resolved and a neighborhood image frame of the t-th image frame, into N image blocks, respectively, both t and N being positive integers;

generating N image block sequences according to the image blocks obtained by decomposing the t-th image frame and the neighborhood image frame, image blocks in the image block sequence being located at same positions of different image frames, respectively;

calculating motion parameters of the image block sequences, motion parameters of any image block sequence being configured for representing optical flows between image blocks of adjacent image frames in the image block sequence;

determining super-resolution network models corresponding to the image block sequences according to the motion parameters of the image block sequences;

performing super-resolution on the image blocks of the t-th image frame in the image block sequences by using the super-resolution network models corresponding to the image block sequences, to obtain super-resolution image blocks of the t-th image frame; and generating a super-resolution image frame of the t-th image frame according to the super-resolution image blocks of the t-th image frame.

17. The non-transitory computer-readable storage medium according to claim 16, wherein the calculating motion parameters of the image block sequences, comprises:

calculating, for each image block sequence, the optical flows between the image blocks of the adjacent image frames in the image block sequence;

calculating, for an optical flow between image blocks of each pair of adjacent image frames, an average value of absolute values of optical flows corresponding to pixels, to obtain a motion parameter between the image blocks of the adjacent image frames; and obtaining the motion parameters of the image block sequence according to the motion parameters between the image blocks of the adjacent image frames in the image block sequence.

18. The non-transitory computer-readable storage medium according to claim 16, wherein the neighborhood image frame of the t-th image frame comprises:

a (t−2)-th image frame, a (t−1)-th image frame, a (t+1)-th image frame and a (t+2)-th image frame.

19. The non-transitory computer-readable storage medium according to claim 18, wherein the determining super-resolution network models corresponding to the image block sequences according to the motion parameters of the image block sequences, comprises:

determining, for each image block sequence, whether a first motion parameter and a second motion parameter of the image block sequence are both less than a preset threshold, the first motion parameter being a motion parameter between the image block of the t-th image frame and the image block of the (t−1)-th image frame, and the second motion parameter being a motion parameter between the image block of the t-th image frame and the image block of the (t+1)-th image frame;

determining that the super-resolution network model corresponding to the image block sequence is a first super-resolution network model in response to the first motion parameter and the second motion parameter being both less than the preset threshold;

determining whether a third motion parameter and a fourth motion parameter of the image block sequence are both less than the preset threshold in response to the first motion parameter and/or the second motion parameter being greater than or equal to the preset threshold, the third motion parameter being a motion parameter between the image block of the (t−2)-th image frame and the image block of the (t−1)-th image frame, and the fourth motion parameter being a motion parameter between the image block of the (t+1)-th image frame and the image block of the (t+2)-th image frame;

determining that the super-resolution network model corresponding to the image block sequence is a second super-resolution network model in response to the third motion parameter and the fourth motion parameter being both less than the preset threshold; and determining that the super-resolution network model corresponding to the image block sequence is a third super-resolution network model in response to the third motion parameter and/or the fourth motion parameter being greater than or equal to the preset threshold.

* * * * *